(12) United States Patent
Koyama et al.

(10) Patent No.: US 10,399,188 B2
(45) Date of Patent: Sep. 3, 2019

(54) METHOD FOR MANUFACTURING UNIVERSAL JOINT

(71) Applicant: JTEKT CORPORATION, Osaka-shi, Osaka (JP)

(72) Inventors: Takeshi Koyama, Neyagawa (JP); Masanori Kobayashi, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 27 days.

(21) Appl. No.: 15/580,381

(22) PCT Filed: Jun. 1, 2016

(86) PCT No.: PCT/JP2016/066286
§ 371 (c)(1),
(2) Date: Dec. 7, 2017

(87) PCT Pub. No.: WO2016/203961
PCT Pub. Date: Dec. 22, 2016

(65) Prior Publication Data
US 2018/0318973 A1    Nov. 8, 2018

(30) Foreign Application Priority Data
Jun. 17, 2015   (JP) .................................. 2015-122095

(51) Int. Cl.
*F16C 21/00*   (2006.01)
*B23P 11/02*   (2006.01)
(Continued)

(52) U.S. Cl.
CPC .............. *B23P 11/02* (2013.01); *B23P 11/00* (2013.01); *F16C 19/466* (2013.01);
(Continued)

(58) Field of Classification Search
CPC ..... B23P 11/02; B23P 11/00; Y10T 29/49636; Y10T 29/4968; Y10T 29/49682;
(Continued)

(56) References Cited

U.S. PATENT DOCUMENTS 3,660,989 A      5/1972  Pitner
2014/0370994 A1  12/2014 Koyama et al.
2015/0275981 A1  10/2015 Kobayashi et al.

FOREIGN PATENT DOCUMENTS

EP   1783387 A1   5/2007
EP   2824344 A2   1/2015
(Continued)

OTHER PUBLICATIONS

Aug. 30, 2016 Written Opinion issued in International Patent Application No. PCT/JP2016/066286.
(Continued)

*Primary Examiner* — Jason L Vaughan
*Assistant Examiner* — Amanda Kreiling
(74) *Attorney, Agent, or Firm* — Oliff PLC

(57) ABSTRACT

A universal joint includes a bearing including a bearing cup fitted in a bearing hole of a yoke and rolling elements arranged between the bearing cup and a shaft portion of a cross shaft. A method for manufacturing the universal joint includes: simulating a shrunken state in which a sample bearing cup selected from bearing cups in a same lot is fitted in the bearing hole such that only an outside diameter is restrained, by press-fitting the sample bearing cup into a reference hole of a reference jig; measuring a diameter of an inscribed circle inscribed to the rolling elements in the shrunken state; setting an outside diameter of the shaft portion to a required outside diameter according to the diameter of the inscribed circle; and inserting the bearing
(Continued)

cup with the rolling elements between the shaft portion having the required outside diameter and the bearing hole.

6 Claims, 8 Drawing Sheets

(51) Int. Cl.
  *F16D 3/41* (2006.01)
  *F16C 35/067* (2006.01)
  *F16D 3/38* (2006.01)
  *F16C 19/46* (2006.01)
  *B23P 11/00* (2006.01)
  *F16D 3/40* (2006.01)

(52) U.S. Cl.
  CPC .......... *F16C 21/005* (2013.01); *F16C 35/067* (2013.01); *F16D 3/382* (2013.01); *F16D 3/41* (2013.01); *B23P 2700/11* (2013.01); *F16D 3/405* (2013.01); *F16D 2250/0084* (2013.01); *F16D 2300/12* (2013.01)

(58) Field of Classification Search
  CPC .......... Y10T 29/53104; Y10T 29/49826; F16D 3/382; F16D 3/405; F16D 3/41
  See application file for complete search history.

(56) References Cited

FOREIGN PATENT DOCUMENTS

| | | |
|---|---|---|
| EP | 2924307 A2 | 9/2015 |
| EP | 3139051 A1 | 3/2017 |
| JP | 355-109135 U | 7/1980 |
| JP | 2004-084949 A | 3/2004 |
| JP | 2007-303575 A | 11/2007 |
| JP | 2015-001300 A | 1/2015 |
| JP | 2015-190588 A | 11/2015 |

OTHER PUBLICATIONS

Aug. 30, 2016 Search Report issued in International Patent Application No. PCT/JP2016/066286.

Jun. 13, 2019 European Search Report issued in European Patent Application No. 16811436.1.

METHOD FOR MANUFACTURING UNIVERSAL JOINT

TECHNICAL FIELD

This invention relates to a method for manufacturing a universal joint.

BACKGROUND ART

In a universal joint of below-described Patent Document 1, a bearing holding a needle is press-fitted into a pin receiving hole (bearing hole) provided on a coupling arm of a yoke, whereby the diameter of the bearing shrinks according to the interference between the bearing and the bearing hole. Through the bearing, a pin portion of a cross pin is inserted.

Moreover, in a cross shaft joint (universal joint) of below-described Patent Document 2, a bearing cup holds rolling elements. The bearing cup is press-fitted into a fitting hole (bearing hole) provided on an arm portion of a joint yoke, whereby the inside diameter of the opening side portion changes in such a manner as to enlarge. Into the bearing cup, the shaft portion of the cross shaft is inserted.

RELATED ART DOCUMENTS

Patent Documents

Patent Document 1: JP-A-2004-084949
Patent Document 2: JP-A-2015-001300

SUMMARY OF THE INVENTION

Problem to be Solved by the Invention

In the universal joints of Patent Documents 1 and 2, by the overlap of the dimension errors of members such as the bearing hole, the bearing cup, the rolling elements and the shaft portion and the assembly errors when the universal joints are assembled by using the members, the radial clearance can vary that corresponds to the difference between the diameter of the inscribed circle of a plurality of rolling elements held by the bearing cup fitted in the bearing hole so that only the outside diameter is restrained, and the outside diameter of the shaft portion.

An object of this invention is to provide a method for manufacturing a universal joint capable of suppressing the radial clearance variation.

Means for Solving the Problem

According to the present invention, there is provided a method for manufacturing a universal joint where a bearing is interposed between each shaft portion of a cross shaft and a corresponding bearing hole of a yoke, and the bearing includes a cylindrical bearing cup fitted in the bearing hole by press-fitting and a plurality of rolling elements annularly arranged between an inner peripheral surface of the bearing cup and an outer peripheral surface of the shaft portion, the method including:

a simulating step of simulating a shrunken state in which a sample bearing cup selected from among a plurality of bearing cups manufactured in a same lot is fitted in the bearing hole of the yoke such that only an outside diameter is restrained, by press-fitting the sample bearing cup into a reference hole of a reference jig;

a measuring step of measuring a diameter of an inscribed circle inscribed to the plurality of rolling elements annularly held along the inner peripheral surface of the sample bearing cup in the simulated shrunken state;

an outside diameter setting step of setting an outside diameter of the shaft portion of the cross shaft to a required outside diameter that enables a required radial clearance to be achieved according to the diameter of the inscribed circle measured at the measuring step; and a bearing cup inserting step of inserting the sample bearing cup having undergone the measuring step or a non-measured bearing cup not having undergone the measuring step among the bearing cups manufactured in the lot, together with the plurality of rolling elements, between the shaft portion of the cross shaft set to the required outside diameter at the outside diameter setting step and the bearing hole.

At the measuring step, a single-piece first reference jig having a stiffness equal to that of the yoke may be used as the reference jig.

At the measuring step, a second reference jig including a plurality of split members which define the reference hole, are split in a circumferential direction of the reference hole and are capable of enlarging and shrinking the reference hole may be used as the reference jig.

At the measuring step, after the sample bearing cup is accommodated in the reference hole in an enlarged state of the reference hole of the second reference jig, a load that shrinks the reference hole such that the simulated shrunken state is achieved may be applied to the split member.

At the outside diameter setting step, the cross shaft of a predetermined group may be selected from among cross shafts sorted into a plurality of groups by the outside diameter of the shaft portion, and the outside diameter of the shaft portion of the cross shaft to be combined with the sample bearing cup or the non-measured bearing cup may be set to the required outside diameter.

At the outside diameter setting step, the outside diameter of the shaft portion of the cross shaft to be combined with the sample bearing cup or the non-measured bearing cup may be finished by finish process and set to the required outside diameter.

At the outside diameter setting step, the diameters of the inscribed circles at all the bearing cups manufactured in the lot may be measured.

Advantages of the Invention

According to the present invention, the diameter shrunken state in which the bearing cup selected from the bearing cups in the same lot is fitted in the bearing hole of the actual yoke such that only the outside diameter is restrained is simulated by using the reference jig, and the diameter of the inscribed circle of the rolling elements in the simulated diameter shrunken state of the bearing cup is measured. By setting, according to the measured diameter of the inscribed circle, the outside diameter of the shaft portion of the cross shaft that enables the required radial clearance to be achieved, variation of the radial clearance at the time of the actual assembly can be suppressed in the same lot.

According to the present invention, the first reference jig which is a single-piece jig having a stiffness equal to that of the yoke is easy to manufacture. According to the second reference jig, an operation to press-fit the bearing cup in the axial direction of the reference hole is unnecessary. For this reason, the life of the second reference jig can be prolonged. By selecting the cross shafts of the group suitable for combination, variation of the radial clearance can be suppressed. By finishing the outside diameter of the shaft portion of the cross shaft by finish processing, the variation of the radial clearance can be further suppressed. By measuring the diameters of the inscribed circles at all the bearing cups manufactured in the lot, the outside diameter of the shaft portion of the cross shaft can be set to an outside diameter suitable for each individual bearing cup. For this reason, the variation of the radial clearance can be still further suppressed.

MODE FOR CARRYING OUT THE INVENTION

In the following, embodiments of the present invention will be described in detail with reference to the attached drawings.

<First Embodiment>

Figure 1:
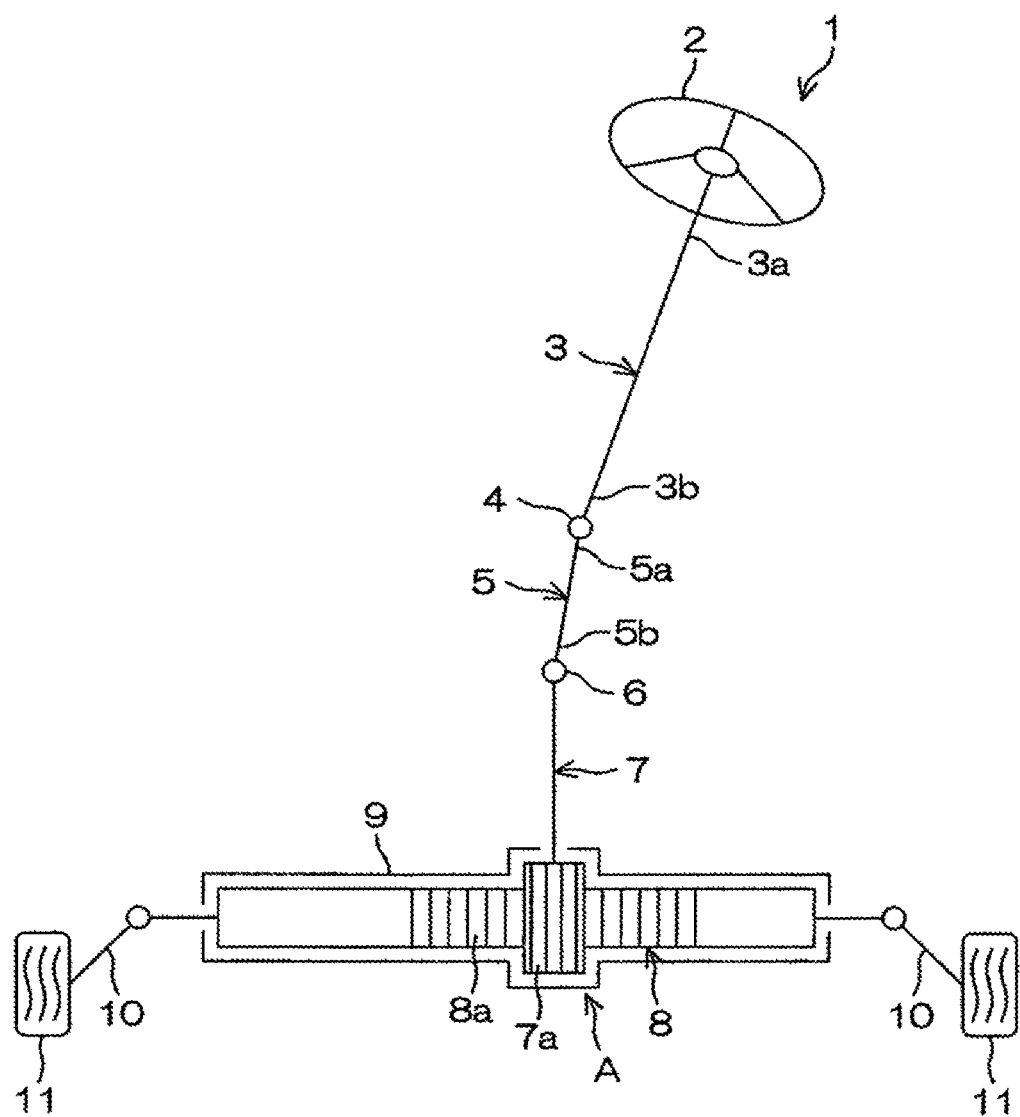
FIG. 1 is a schematic view showing a schematic structure of a steering device including a universal joint manufactured by a method for manufacturing the universal joint according to a first embodiment of the present invention.

FIG. 1 is a schematic view showing a schematic structure of a steering device 1 including universal joints 4 and 6 manufactured by a method for manufacturing a universal joint according to a first embodiment. Referring to FIG. 1, the steering device 1 is provided with a steering shaft 3, the universal joint 4, an intermediate shaft 5, the universal joint 6, a pinion shaft 7 and a rack shaft 8.

One end 3a of the steering shaft 3 is coupled to a steering member 2 such as a steering wheel. The other end 3b of the steering shaft 3 is coupled to one end 5a of the intermediate shaft 5 through the universal joint 4. The other end 5b of the intermediate shaft 5 is coupled to the pinion shaft 7 through the universal joint 6. A pinion 7a provided in the neighborhood of the end portion of the pinion shaft 7 meshes with rack teeth 8a provided on the rack shaft 8 extending in the direction of the vehicle width (horizontal direction).

The pinion shaft 7 and the rack shaft 8 constitute a rack and pinion mechanism A. The rack shaft 8 is supported in such a manner as to be linearly reciprocatable through a plurality of non-illustrated bearings in a housing 9 fixed to a vehicle body (not shown).

Both end portions of the rack shaft 8 protrude toward both sides of the housing 9, and to each end portion, a tie rod 10 is coupled. The tie rods 10 are coupled to corresponding wheels 11 through corresponding knuckle arms (not shown), respectively.

When the steering member 2 is operated to rotate the steering shaft 3, this rotation is converted into a linear motion of the rack shaft 8 in the horizontal direction of the vehicle by the pinion 7a and the rack teeth 8a. Thereby, turning of the corresponding wheels 11 is achieved.

Figure 2:
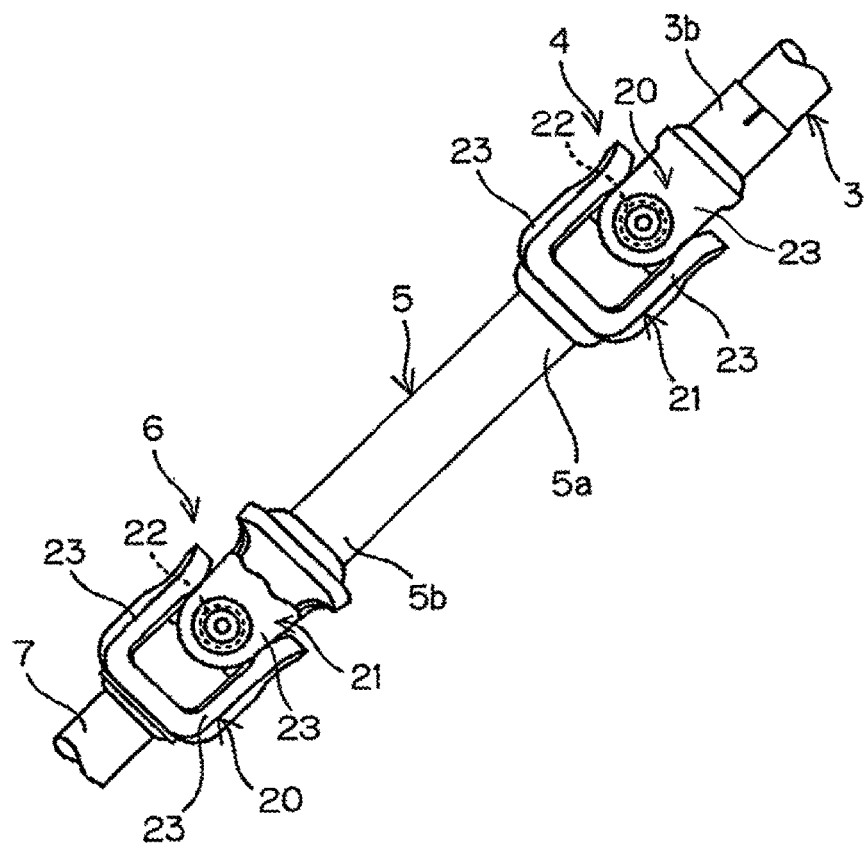
FIG. 2 is a side view of the periphery of an intermediate shaft where the universal joints are disposed on the ends.

FIG. 2 is a side view of the periphery of the intermediate shaft 5 where the universal joints 4 and 6 are disposed on the ends 5a and 5b. Referring to FIG. 2, the universal joint 4 is provided with a yoke 20 provided on the other end 3b of the steering shaft 3, a yoke 21 provided on the one end 5a of the intermediate shaft 5 and a cross shaft 22 coupling the yokes 20 and 21.

Likewise, the universal joint 6 is provided with the yoke 20 provided on the end portion of the pinion shaft 7, the yoke 21 provided on the other end 5b of the intermediate shaft 5 and the cross shaft 22 coupling the yokes 20 and 21.

The yokes 20 and 21 have a U shape, and each have a pair of arm portions 23. In FIG. 2, for the yoke 20 of the universal joint 4, only one arm portion 23 is shown, and for the yoke 21 of the universal joint 6, only one arm portion 23 is shown. The pair of arm portions 23 are parallel to each other.

Figure 3:
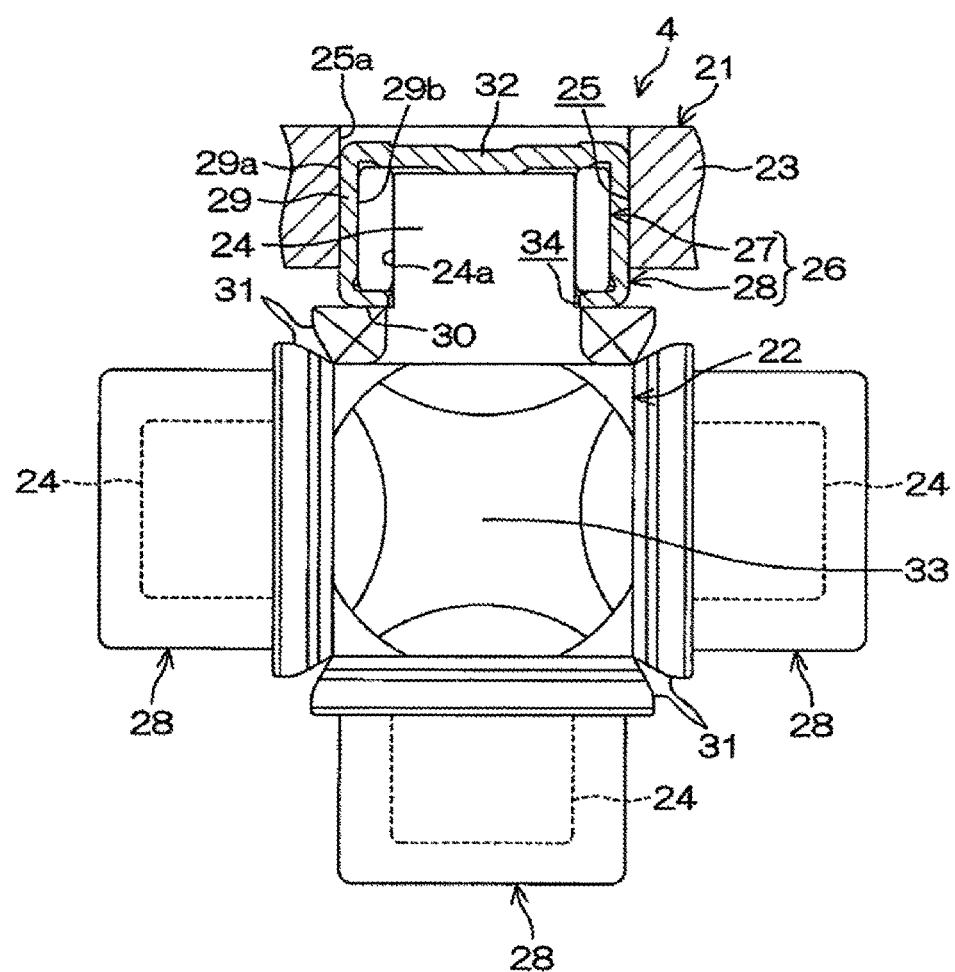
FIG. 3 is a partially broken side view of a relevant part of the universal joint.

Since the universal joints 4 and 6 have completely the same structure, in the following, description will be given in conformance with the universal joint 4. FIG. 3 is a partially broken side view of a relevant part of the universal joint 4. Referring to FIG. 3, the cross shaft 22 includes a barrel portion 33 disposed in the central portion of the cross shape and four shaft portions 24 protruding from this barrel portion 33 in a cross shape. The shaft portions 24 are formed in a cylindrical shape.

The arm portions 23 each have a bearing hole 25 through which the corresponding shaft portion 24 of the cross shaft 22 is inserted. In FIG. 3, only one arm portion 23 is shown. Since the structures that couple the arm portions 23 and the corresponding shaft portions 24 are the same, in the following, description will be mainly given in conformance with one arm portion 23 and the corresponding shaft portion 24.

The universal joint 4 is provided with a bearing 26 interposed between an outer peripheral surface 24a of the shaft portion 24 and an inner peripheral surface 25a of the corresponding bearing hole 25. The arm portion 23 rotatably supports the corresponding shaft portion 24 through the bearing 26 fitted in the bearing hole 25 and held.

The bearing 26 includes a cylindrical bearing cup 28 having a bottom and fitted in the bearing hole 25 by press-fitting and a plurality of rolling elements 27 held by the bearing cup 28. The rolling elements 27 are, for example, needle rollers.

The bearing cup 28 is made of a sheet metal plate member, and includes a cylindrical peripheral wall 29, a bottom wall 32 provided on one end of the peripheral wall 29 in the axial direction and an annular flange portion 30 extended inward in the radial direction of the peripheral wall 29 from the other end of the peripheral wall 29 in the axial direction. The bearing cup 28 has an opening 34 at the other end of the peripheral wall 29 in the axial direction.

Part of an outer peripheral surface 29a of the peripheral wall 29 is in pressure contact with the inner peripheral surface 25a of the bearing hole 25 of the arm portion 23. The annular flange portion 30 is in contact with an annular oil seal 31 fitted to the outside of the base end portion of the shaft portion 24, and the gap between the bearing cup 28 and the shaft portion 24 is sealed.

The plurality of rolling elements 27 are annularly arranged between an inner peripheral surface 29b of the peripheral wall 29 of the bearing cup 28 and the outer peripheral surface 24a of the shaft portion 24. The plurality of rolling elements 27 are in rolling contact with both the inner peripheral surface 29b and the outer peripheral surface 24a. The bearing cup 28 rotatably supports the shaft portion 24 through the rolling elements 27.

Figure 4:
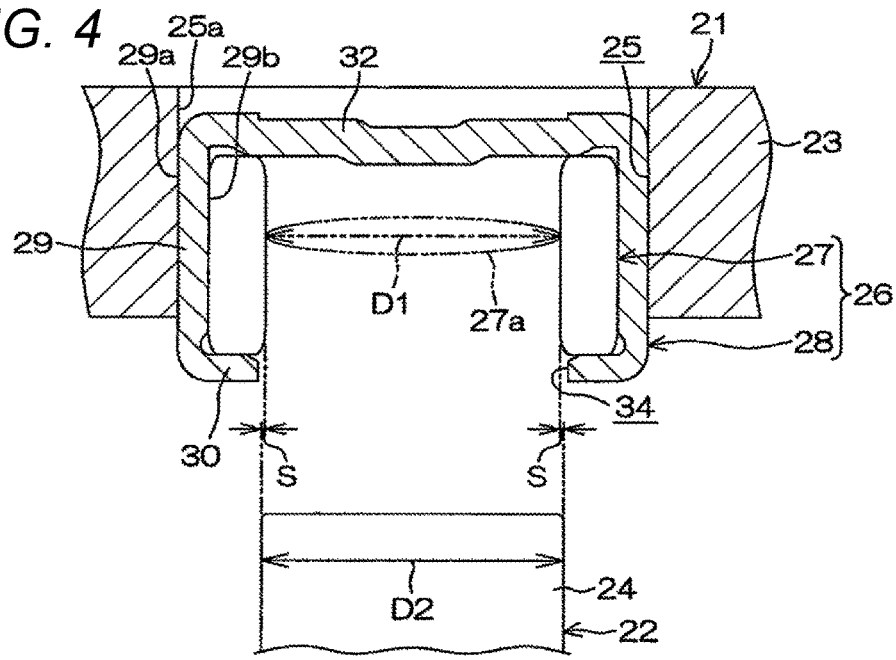
FIG. 4 is an explanatory view of a radial clearance.

Referring to FIG. 4 which is a schematic view for explanation, the radial clearance S of the bearing 26 corresponds to a value which is the difference when a shaft portion outside diameter D2 which is the outside diameter of the shaft portion 24 is subtracted from an inscribed circle diameter D1 which is the diameter of an inscribed circle 27a of the plurality of rolling elements 27 held by the bearing cup 28 under a condition where the bearing cup 28 is fitted in the bearing hole 25 so that only the outside diameter is restrained. That is, S=D1−D2.

When the inscribed circle diameter D1 is larger than the shaft portion outside diameter D2 (D1>D2), the radial clearance S takes a positive value (S>0). The radial clearance S in this case is referred to as positive clearance.

When the inscribed circle diameter D1 is smaller than the shaft portion outside diameter D2 (D1<D2), the radial clearance S takes a negative value (S<0). The radial clearance S in this case is referred to as negative clearance.

Next, a method for manufacturing the universal joint 4 will be described.

Figure 5:
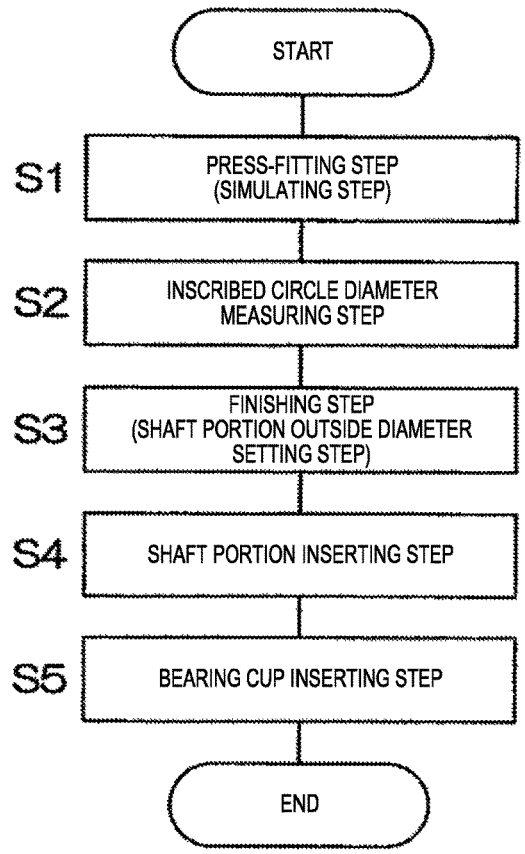
FIG. 5 is a flowchart showing the method for manufacturing the universal joint.

FIG. 5 is a flowchart showing the method for manufacturing the universal joint according to the first embodiment of the present invention.

As shown in FIG. 5, the method for manufacturing the universal joint 4 is provided with a press-fitting step as the simulating step (step S1), an inscribed circle diameter measuring step (step S2), a finishing step as a shaft portion outside diameter setting step (step S3), a shaft portion inserting step (step S4) and a bearing cup inserting step (step S5) in succession.

FIG. 6(a) to FIG. 6(e) are schematic views successively showing the steps of manufacturing the universal joint 4.

Figure 6A:
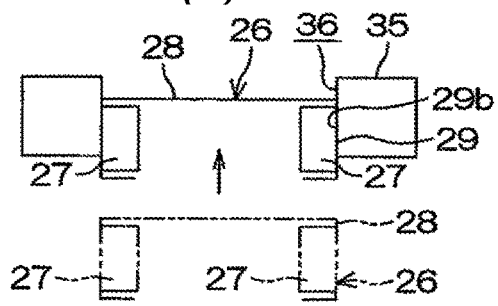
FIGS. 6(a) to 6(e) are schematic views successively showing steps of manufacturing the universal joint in the first embodiment.

At the press-fitting step as the simulating step shown in FIG. 6(a) (step S1 of FIG. 5), the bearing cup 28 annularly holding the plurality of rolling elements 27 is arbitrarily selected from the same lot and press-fitted into a reference hole 36 of a first reference jig 35 as the reference jig.

The first reference jig 35 is, for example, a cylindrical or annular single-piece jig. Since the first reference jig 35 has a stiffness equal to that of the yoke 21 [see FIG. 6(e)], a stress balance condition equal to the stress balance condition of the bearing cup 28 and the yoke 21 when the bearing cup 28 is press-fitted into the bearing hole 25 of the yoke 21 is simulated. That is, by the press-fitting step, the diameter shrunken state when the selected bearing cup 28 is fitted in the bearing hole 25 of the yoke 21 so that only the outside diameter is restrained is simulated.

Figure 6B:
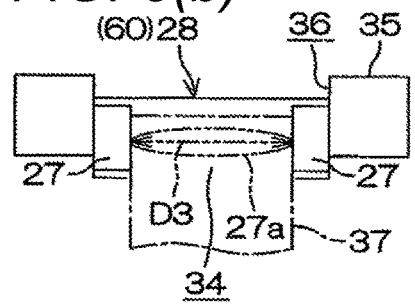

Then, at the inscribed circle diameter measuring step shown in FIG. 6(b) (step S2 of FIG. 5), an inscribed circle diameter D3 which is the diameter of the inscribed circle 27a of the plurality of rolling elements 27 held in the bearing cup 28 in the simulated diameter shrunken state is measured. The measurement of the inscribed circle diameter D3 is performed by inserting a measurement jig 37 such as a bore gauge or a pin gauge from the opening 34.

The press-fitting step and the inscribed circle diameter measuring step are performed on some of the bearing cups 28 selected from among the bearing cups 28 in the same lot. The bearing cups 28 having undergone the inscribed circle diameter measuring step will be referred to as measured bearing cups 60 (sample bearing cups). Of the bearing cups 28 in the same lot as that of the measured bearing cups 60, the bearing cups 28 not having undergone the inscribed circle diameter measuring step will be referred to as non-measured bearing cups 61 [see FIG. 6(e)].

Figure 6C:
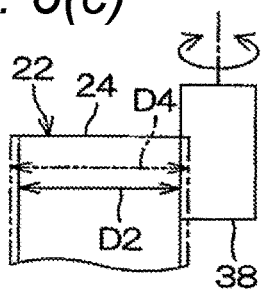
Figure 6D:
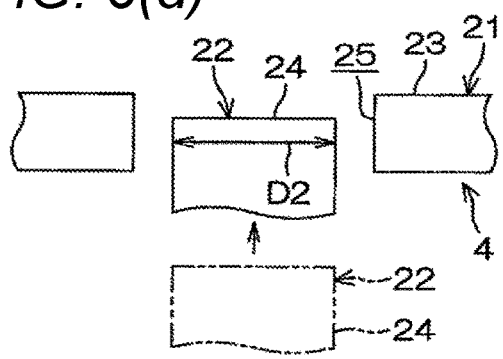
Figure 6E:
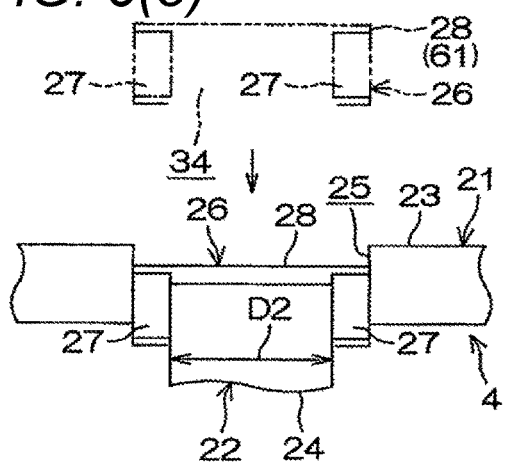

Then, at the finishing step as the shaft portion outside diameter setting step shown in FIG. 6(c) (step S3 of FIG. 5), a shaft portion outside diameter D4 which is the outside diameter of the shaft portion 24 of the cross shaft 22 combined with the non-measured bearing cup 61 [see FIG. 6(e)] is finished. Specifically, the shaft portion outside diameter D4 is finished, by finish processing, to a required shaft portion outside diameter D2 that enables a required radial clearance S (see FIG. 4) to be achieved according to the inscribed circle diameter D3 measured at the inscribed circle diameter measuring step [see FIG. 6(b)]. In the finish processing, an abrasive tool 38 is used.

Then, at the shaft portion inserting step shown in FIG. 6(d) (step S4 of FIG. 5), the shaft portion 24 set to the required shaft portion outside diameter D2 at the finishing step is inserted into the bearing hole 25 of the yoke 21.

Then, at the bearing cup inserting step shown in FIG. 6(e) (step S5 of FIG. 5), the non-measured bearing cup 61 with the opening 34 facing the side of the yoke 21 is inserted, together with the plurality of rolling elements 27, between the shaft portion 24 set to the required shaft portion outside diameter D2 at the finishing step and the bearing hole 25.

For the bearing cup inserting step, both the measured bearing cup 60 and the non-measured bearing cup 61 may be used.

According to the first embodiment, the diameter shrunken state when the bearing cup 28 selected from the same lot is fitted in the bearing hole 25 of the actual yokes 20 and 21 so that only the outside diameter is restrained is simulated by using the first reference jig 35, and the inscribed circle diameter D3 of the rolling elements 27 in the simulated diameter shrunken state of the bearing cup 28 is measured. By setting, according to the measured inscribed circle diameter D3, the shaft portion outside diameter D2 of the cross shaft 22 that enables the required radial clearance S to be achieved, variation of the radial clearance S at the time of the actual assembly can be suppressed in the same lot.

Moreover, the first reference jig 35 which is a single-piece jig having a stiffness equal to that of the yokes 20 and 21 is easy to manufacture.

Moreover, by finishing the shaft portion outside diameter D4 of the cross shaft 22 by finish processing, the variation of the radial clearance S can be further suppressed.

<Second Embodiment>

Figure 7:
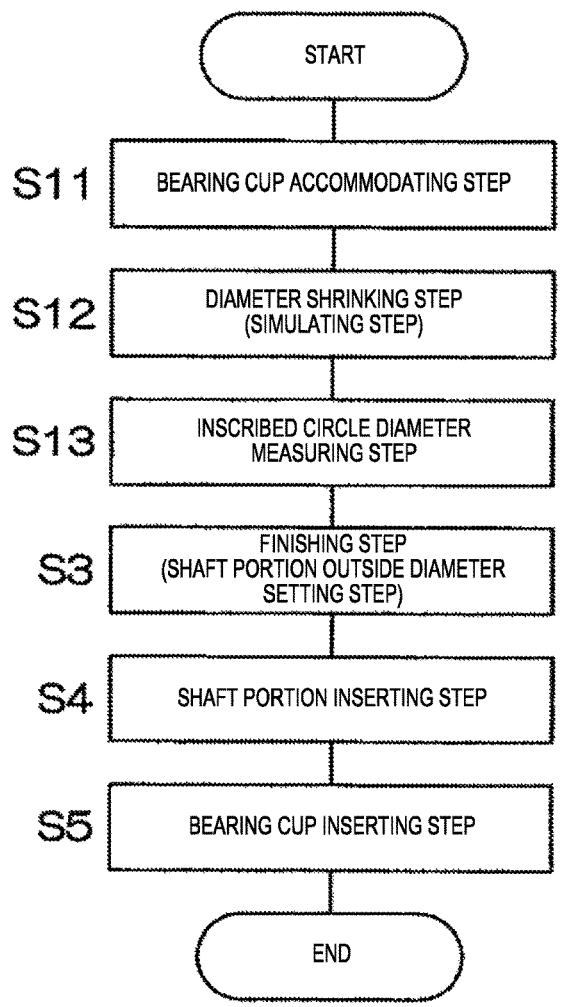
FIG. 7 is a flowchart showing a method for manufacturing a universal joint of a second embodiment of the present invention.

FIG. 7 is a flowchart showing a method for manufacturing the universal joint 4 of a second embodiment of the present invention.

The method for manufacturing the universal joint 4 of the second embodiment shown in FIG. 7 is mainly different from the method for manufacturing the universal joint 4 of the first embodiment shown in FIG. 5 in that step S11, step S12 and step S13 are provided instead of step S1 and step S2.

That is, the method for manufacturing the universal joint 4 of the second embodiment is provided with a bearing cup accommodating step (step S11), a diameter shrinking step as the simulating step (step S12), an inscribed circle diameter measuring step (step S13) and the finishing step as the shaft portion outside diameter setting step (step S3), the shaft portion inserting step (step S4) and the bearing cup inserting step (step S5) in succession.

Moreover, as in the first embodiment, since the universal joint 6 has completely the same structure as the universal joint 4, description will be given in conformance with the universal joint 4.

Figure 8:
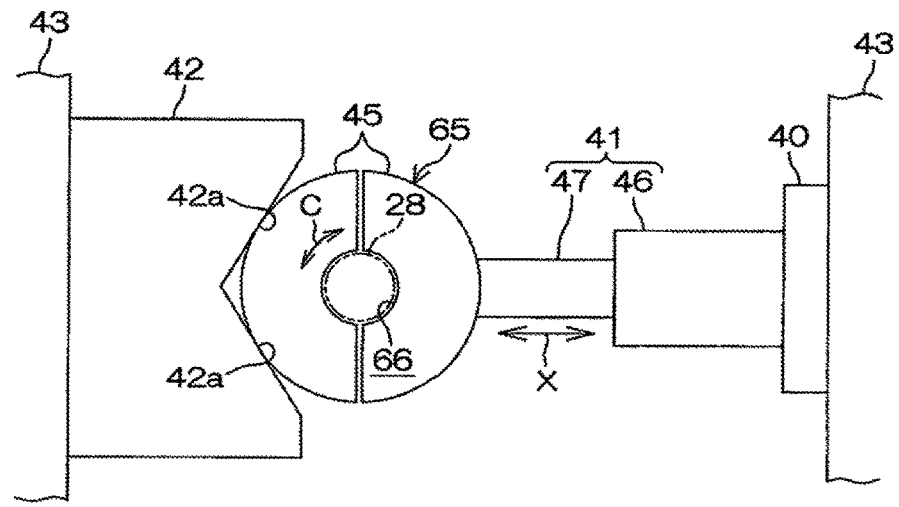
FIG. 8 is a plan view of a reference jig of the second embodiment and its peripheral members.

FIG. 8 is a plan view of a second reference jig 65 of the second embodiment and its peripheral members.

Referring to FIG. 8, in the method for manufacturing the universal joint 4 of the second embodiment, the second reference jig 65 as the reference jig, a load detection member 40, a cylinder 41, a support member 42 and a pair of bases 43 are used.

The second reference jig 65 includes a plurality of split members 45. The plurality of split members 45 define a reference hole 66 therebetween and are split in the circumferential direction C of the reference hole 66. In the second embodiment, the split members 45 are provided in a pair.

The load detection member 40 is, for example, a load cell, and fixed to one base 43.

The cylinder 41 is attached to the load detection member 40. The cylinder 41 is, for example, a hydraulic cylinder or an electric cylinder. The cylinder 41 includes a cylinder body 46 as a fixing portion and a cylinder rod 47 as a movable portion.

The cylinder body 46 is fixed to the one base 43 through the load detection member 40. The cylinder rod 47 is coupled to one split member 45, and driven by the cylinder body 46 in the axial direction X of the cylinder rod 47. The pair of bases 43 are fixed to each other in a state of facing in the axial direction X.

The support member 42 is fixed to the other base 43, and supports the other split member 45. The support member 42 is disposed on the opposite side of the cylinder 41 with the second reference jig 65 in between. The support member 42 has a V-shaped recess where a pair of support surfaces 42a are formed. The pair of support surfaces 42a each abut on the other split member 45.

The cross-sectional shape of the recess of the support member 42 may be any shape as long as it can support the other split member 45 in such a manner that the centers of support by the split members 45 (corresponding to the curvature centers of the support surfaces of the split members 45) with respect to the bearing cup 28 coincide with each other when the bearing cup 28 is supported in a predetermined diameter shrunken state between the arc-surface-form support surfaces of the pair of split members 45. Therefore, the cross-sectional shape of the recess of the support member 42 is not limited to the V shape but may be a polygonal shape or an arc shape.

The other split member 45 moves in the axial direction X integrally with the cylinder rod 47. For this reason, the size of the reference hole 66 of the second reference jig 65 changes by the cylinder rod 47 moving in the axial direction X.

Specifically, when the cylinder rod 47 moves toward the one base 43, the reference hole 66 is enlarged so as to have a diameter where the bearing cup 28 can be accommodated without pressurized (for example, with the provision of play in the radial direction). When the cylinder rod 47 moves toward the other base 43, the reference hole 66 is shrunken so as to have a diameter where the bearing cup 28 is fitted by press-fitting and a state where it is shrunken to a predetermined diameter is achieved. As described above, in the second reference jig 65, the diameter of the reference hole 66 can be enlarged or shrunken by the movement of the one split member 45 in the axial direction X.

Figure 9A:
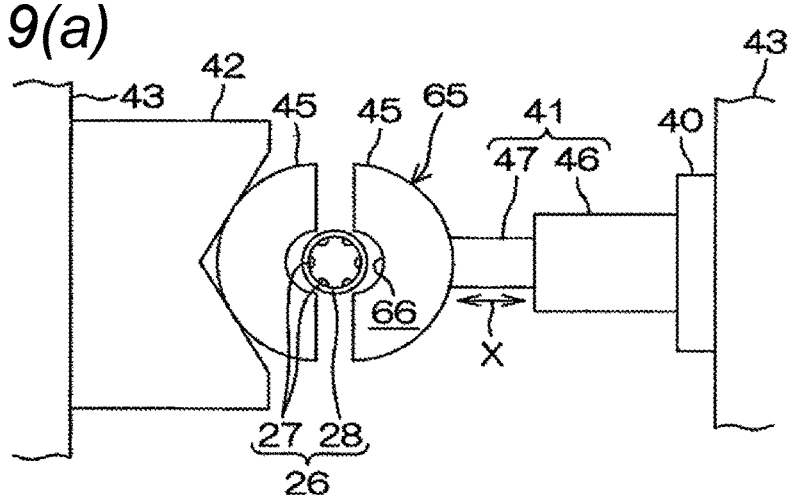
FIGS. 9(a) to 9(c) are schematic views successively showing part of the steps of manufacturing the universal joint in the second embodiment.
Figure 9B:
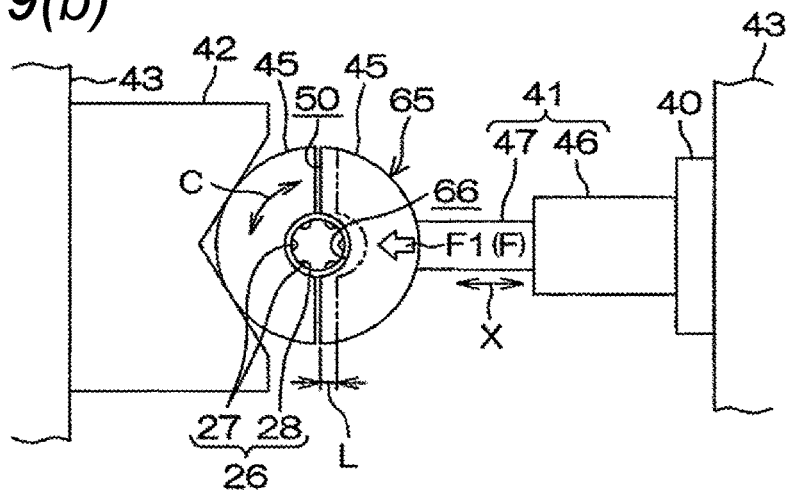
Figure 9C:
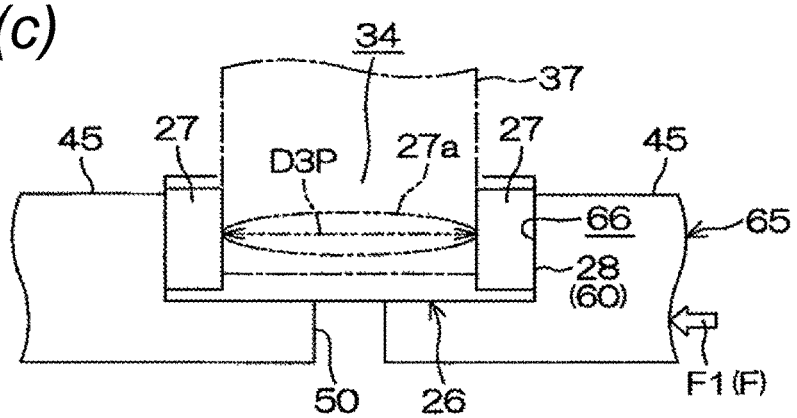

FIG. 9(*a*) to FIG. 9(*c*) are schematic views successively showing some of the steps of manufacturing the universal joint 4 of the second embodiment. FIG. 9(*a*) and FIG. 9(*b*) are plan views. FIG. 9(*c*) is a side view, and illustrates only the periphery of the bearing cup 28.

At the bearing cup accommodating step shown in FIG. 9(*a*) (step S11 of FIG. 7), the bearing cup 28 arbitrarily selected from the same lot is accommodated in the reference hole 66 of the second reference jig 65 in the enlarged state in a state of annularly holding the plurality of rolling elements 27.

Then, at the shrinking step as the simulating step shown in FIG. 9(*b*) (step S12 of FIG. 7), the one split member 45 approaches the other split member 45 as the cylinder rod 47 extends in the axial direction X. Thereby, the reference hole 66 of the second reference jig 65 shrinks, and the load F that shrinks the bearing cup 28 is supplied to the bearing cup 28 through the one split member 45. The load F applied to the one split member 45 in order to shrink the bearing cup 28 is detected by the load detection member 40. The movement amount of the cylinder rod 47 (a displacement amount L of the one split member 45 in the axial direction X) is adjusted so that the load F detected by the load detection member 40 is a reference load F1. Since a clearance 50 in the circumferential direction C is provided between the pair of split members 45, the reference load F1 from the one split member 45 is transmitted to the bearing cup 28.

By the reference load F1 being applied to the bearing cup 28, a stress balance condition equal to the stress balance condition of the bearing cup 28 and the yoke 21 when the bearing cup 28 is press-fitted into the bearing hole 25 of the yoke 21 is simulated. That is, by the shrinking step, simulation of the shrunken state when the selected bearing cup 28 is fitted in the bearing hole 25 of the yoke 21 so that only the outside diameter is restrained is achieved.

Then, at the inscribed circle diameter measuring step shown in FIG. 9(*c*) (step S13 of FIG. 7), an inscribed circle diameter D3P which is the diameter of the inscribed circle 27a inscribed to the plurality of rolling elements 27 held by the bearing cup 28 in the simulated shrunken state is measured by using the measurement jig 37.

At the inscribed circle diameter measuring step of the second embodiment, the inscribed circle diameters D3P related to all the bearing cups 28 in the same lot are measured. For this reason, the bearing cups 28 used at the finishing step (step S3), the shaft portion inserting step (step S4) and the bearing cup inserting step (step S5) of the second embodiment are all the measured bearing cups 60.

According to the second embodiment, the shrunken state when the bearing cup 28 selected from the same lot is fitted in the bearing hole 25 of the actual yokes 20 and 21 so that only the outside diameter is restrained is simulated by using the second reference jig 65, and the inscribed circle diameter D3P of the rolling elements 27 in the simulated shrunken state of the bearing cup 28 is measured. By setting, according to the measured inscribed circle diameter D3P, the shaft portion outside diameter D2 of the cross shaft 22 that enables the required radial clearance S to be achieved, variation of the radial clearance S at the time of the actual assembly in the same lot can be suppressed. Moreover, individual setting of the radial clearance S (see FIG. 4) is possible.

Moreover, an operation to press-fit the bearing cup 28 in the axial direction of the reference hole 66 is unnecessary. For this reason, the life of the second reference jig 65 can be prolonged.

Moreover, by finishing the shaft portion outside diameter D4 of the cross shaft 22 by finish processing, the variation of the radial clearance S can be further suppressed.

Moreover, the shaft portion outside diameter D2 of the cross shaft 22 can be set to an outside diameter suitable for each individual bearing cup 28. For this reason, the variation of the radial clearance S can be still further suppressed.

This invention is not limited to the above-described embodiments, and various modifications are possible within the scope recited in the claims.

Figure 10:
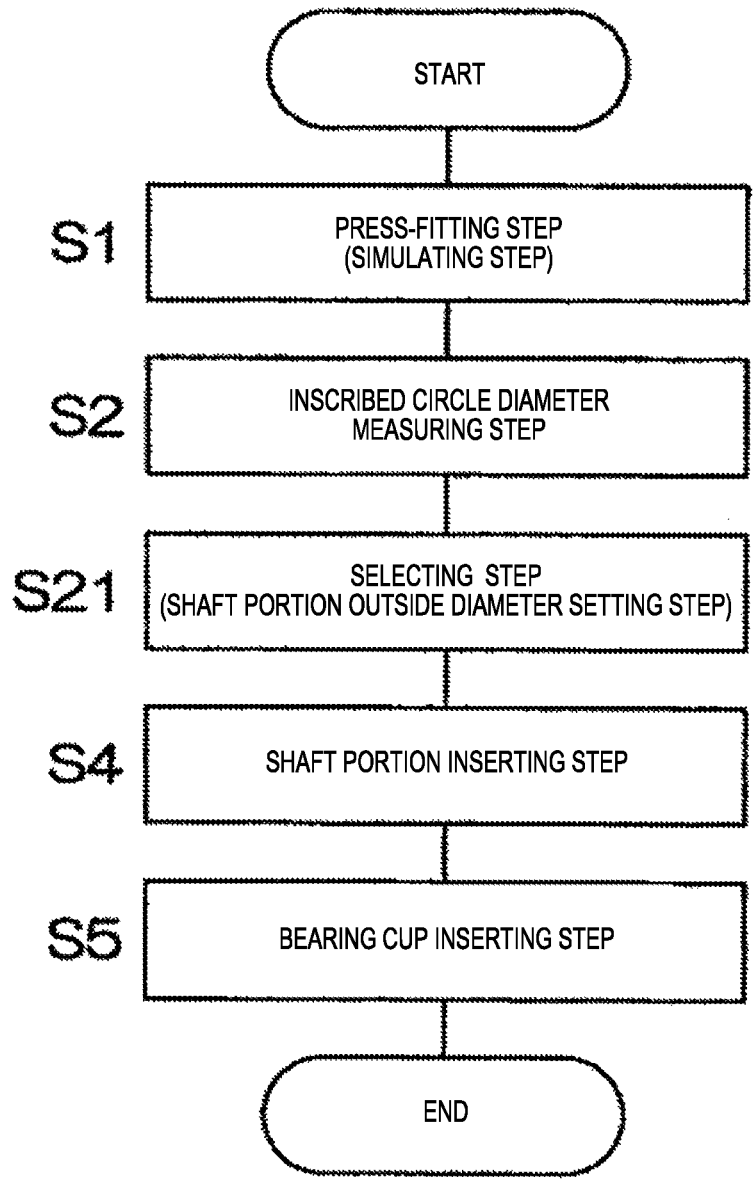
FIG. 10 is a flowchart showing a modification of the method for manufacturing the universal joint of the first embodiment.

For example, referring to FIG. 10 which is a flowchart showing a modification of the method for manufacturing the universal joints 4 and 6 of the first embodiment of FIG. 5, the method for manufacturing the universal joints 4 and 6 may be provided with a selecting step as the shaft portion outside diameter setting step (step S21) instead of the finishing step of FIG. 5 (step S3).

At the selecting step, a predetermined group of cross shafts 22 are selected from among the cross shafts 22 sorted into a plurality of groups by the outside diameter of the shaft portion 24. Thereby, the shaft portion outside diameter D4 of the cross shaft 22 combined with the measured bearing cups 60 or the non-measured bearing cups 61 is set to a required shaft portion outside diameter D2. When the method for manufacturing the universal joints 4 and 6 includes the selecting step, at the inscribed circle diameter measuring step, the inscribed circle diameter D3 is measured for each lot. For this reason, by selecting the cross shafts 22 of the group suitable for combination, variation of the radial clearance S can be suppressed.

Moreover, although not shown, the method for manufacturing the universal joints 4 and 6 of the second embodiment may include the selecting step instead of the finishing step.

Moreover, at the inscribed circle diameter measuring step of the first embodiment, the inscribed circle diameters D3 related to all the bearing cups 28 in the same lot may be measured.

Moreover, at the inscribed circle diameter measuring step of the second embodiment, the inscribed circle diameters D3P related to some of the bearing cups 28 in the same lot may be measured. That is, the bearing cups 28 used at the finishing step (step S3), the shaft portion inserting step (step S4) and the bearing cup inserting step (step S5) of the second embodiment may be the non-measured bearing cups 61.

Moreover, the method for manufacturing the universal joint of the present invention is not limited to the universal joints 4 and 6 for the intermediate shaft 5 but may also be applied to general universal joints having a cross shaft.

INDUSTRIAL APPLICABILITY

According to the method for manufacturing the universal joint of the present invention, a plurality of universal joints where the radial clearance variation is suppressed can be manufactured.

DESCRIPTION OF REFERENCE SIGNS

4: Universal Joint
6: Universal Joint
20: Yoke
21: Yoke
22: Cross Shaft
24: Shaft portion
24a: Outer Peripheral Surface
25: Bearing Hole
26: Bearing
27: Rolling Element
27a: Inscribed Circle
28: Bearing Cup
29b: Inner Peripheral Surface
35: First Reference Jig
36: Reference Hole
45: Split Member
60: Measured Bearing Cup (Sample Bearing Cups)
61: Non-measured Bearing Cup
65: Second Reference Jig
66: Reference Hole
C: Circumferential Direction
D2: Required Shaft Portion Outside Diameter
D3: Inscribed Circle Diameter
D3P: Inscribed Circle Diameter
D4: Shaft Portion Outside Diameter
F1: Reference Load
S: Required Radial Clearance

The invention claimed is:

1. A method for manufacturing a universal joint where a bearing is interposed between each shaft portion of a cross shaft and a corresponding bearing hole of a yoke, and the bearing comprises a cylindrical bearing cup fitted in the bearing hole by press-fitting and a plurality of rolling elements annularly arranged between an inner peripheral surface of the bearing cup and an outer peripheral surface of the shaft portion, the method comprising:

simulating a shrunken state in which a sample bearing cup selected from among a plurality of bearing cups manufactured in a same lot is fitted in the bearing hole of the yoke such that only an outside diameter is restrained, by press-fitting the sample bearing cup into a reference hole of a reference jig;

measuring a diameter of an inscribed circle inscribed to the plurality of rolling elements annularly held along the inner peripheral surface of the sample bearing cup in the simulated shrunken state;

setting an outside diameter of the shaft portion of the cross shaft to a required outside diameter that enables a required radial clearance to be achieved according to the measured diameter of the inscribed circle; and inserting the sample bearing cup having undergone measurement of the diameter of the inscribed circle or a non-measured bearing cup not having undergone the measurement of the diameter of the inscribed circle among the bearing cups manufactured in the lot, together with the plurality of rolling elements, between the shaft portion of the cross shaft set to the required outside diameter and the bearing hole.

2. The method for manufacturing the universal joint according to claim 1, wherein when the diameter of the inscribed circle is measured, a single-piece first reference jig having a stiffness equal to that of the yoke is used as the reference jig.

3. The method for manufacturing the universal joint according to claim 1, wherein when the diameter of the inscribed circle is measured, a second reference jig comprising a plurality of split members which define the reference hole, are split in a circumferential direction of the reference hole and are capable of enlarging and shrinking the reference hole is used as the reference jig, and wherein when the diameter of the inscribed circle is measured, after the sample bearing cup is accommodated in the reference hole in an enlarged state of the reference hole of the second reference jig, a load that shrinks the reference hole such that the simulated shrunken state is achieved is applied to the split member.

4. The method for manufacturing the universal joint according to claim 1,
wherein when the outside diameter of the shaft portion is set, the cross shaft of a predetermined group is selected from among cross shafts sorted into a plurality of groups by the outside diameter of the shaft portion, and the outside diameter of the shaft portion of the cross shaft to be combined with the sample bearing cup or the non-measured bearing cup is set to the required outside diameter.

5. The method for manufacturing the universal joint according to claim 1,
wherein when the outside diameter of the shaft portion is set, the outside diameter of the shaft portion of the cross shaft to be combined with the sample bearing cup or the non-measured bearing cup is finished by finish process and set to the required outside diameter.

6. The method for manufacturing the universal joint according to claim 5,
wherein when the diameter of the inscribed circle is measured, the diameters of the inscribed circles at all the bearing cups manufactured in the lot are measured.

* * * * *